UNITED STATES PATENT OFFICE.

ALEX B. DAVIS, OF INDIANAPOLIS, INDIANA, ASSIGNOR TO THE ELI LILLY AND COMPANY, OF INDIANAPOLIS, INDIANA, A CORPORATION OF INDIANA.

MERCURY COMPOUNDS AND PROCESSES OF PRODUCING SAME.

1,079,693.  Specification of Letters Patent.  Patented Nov. 25, 1913.

No Drawing.  Application filed November 16, 1912. Serial No. 731,902.

*To all whom it may concern:*

Be it known that I, ALEX B. DAVIS, a citizen of the United States, residing at Indianapolis, Marion county, and State of Indiana, have invented and discovered certain new and useful Improvements in Mercury Compounds and Processes of Producing Same, of which the following is a specification.

My invention relates to compounds of mercury of the coumarin series, more especially to those members of the series containing a free or substituted hydroxyl group in the benzene ring; and to processes for producing the same. Such compounds may be formed from beta-methyl-umbelliferone, beta-phenyl-umbelliferone, 3-oxy-coumarin, 5-oxy-coumarin, etc. Such a compound is dissolved in alcohol, either pure or dilute, and one molecular proportion of a mercury salt in solution, more especially mercuric acetate, is added while both solutions are hot. In concentrated solutions the mercury compound may begin to separate at once, while more dilute solutions may remain clear for several minutes before the compound begins to separate, which it does, usually in the form of fine, nearly white, needles, readily soluble in dilute solutions of fixed alkalis and sparingly soluble in alcohol. The solution of the compound in alkali may be evaporated to dryness in a vacuum at a temperature not to exceed 100° C., when the mercury compound is obtained in combination with potassium or sodium, the resulting compound being readily soluble in water.

Taking a specific example, 17.7 parts of beta-methyl-umbelliferone are dissolved in about 200 parts of methyl alcohol and to this solution while hot there is added a solution of 31.8 parts of mercuric acetate in about 100 parts of water. Almost immediately the two combine and the mercury derivative of the umbelliferone begins to separate in fine white needle like crystals. These are filtered off and dried and are then dissolved in one molecular proportion of caustic soda solution; the resulting solution is evaporated to dryness in a vacuum at a temperature not exceeding 100° C. when the sodium compound of the mercury derivative of beta-methyl-umbelliferone is obtained as a yellow mass.

The corresponding compound of beta-phenyl-umbelliferone may be prepared by substituting 24.9 parts of beta-phenyl-umbelliferone for the 17.7 parts beta-methyl-umbelliferone and increasing the alcohol to a sufficient quantity to dissolve the compound. The mercury derivative of beta-methyl-umbelliferone contains about 47% of mercury and has probably the following constitution:—

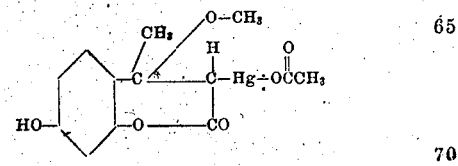

This constitution may differ according to the different solvents which may be used in the process; that is, the methoxyl group will be replaced by any other alcohol group, as for instance if ethyl alcohol be used instead of methyl alcohol as a solvent, and the reaction allowed to take place, then the methoxyl would be replaced by ethoxyl.

In addition to the oxycoumarin compounds particularly mentioned in the description of the specific processes above set forth, a number of other compounds which lend themselves to the manufacture of these new mercury compounds may be used, any of which compounds may be represented by the following formula:—

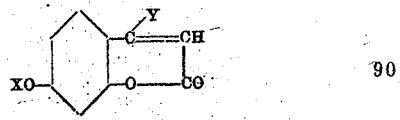

in which X may be an alkali metal, or it may be an acetyl or benzoyl or similar pure or substituted acid radical, or it may be an aryl or alkyl group either pure or substituted; and Y may be an aryl or alkyl group either pure or substituted. Mercury derivatives may be formed from compounds represented by this formula by adding a mercury salt as heretofore described.

The mercury compounds herein described are valuable antiseptics which do not corrode surgical instruments, irritate the skin, nor precipitate albumin. The mercury is not precipitated from these compounds by cold ammonium sulfid except on long standing; nor by alkalis except upon continued boiling.

Having thus described my invention what I claim is:

1. A mercury compound consisting of a mercury salt combined with an oxycoumarin, substantially as described.

2. A mercury compound consisting of a mercury salt combined with an umbelliferone, substantially as described.

3. A mercury derivative which consists of a salt of mercury combined with an oxycoumarin, in which the mercury is combined by one valence with a carbon atom of the oxycoumarin and by the other valence with the group originally present in the mercury salt, substantially as described.

4. A mercury compound which is formed by the combination of mercury with compounds of the type represented by the formula:

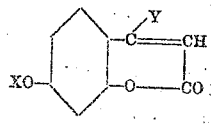

in which X may be a radical capable of substituting hydrogen in a hydroxyl and Y may be any radical capable of substituting the methyl group in beta-methyl-umbelliferone.

5. A mercury compound soluble in water consisting of the combination of an oxycoumarin, a mercury salt and a base, substantially as described.

6. A mercury derivative of the coumarin series having the following formula:

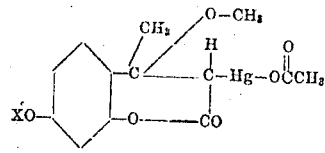

in which X is an alkali metal.

7. The process of producing a mercury derivative which consists in adding to a solution of a mercury salt, a solution of a compound of the oxycoumarin series substantially as described.

8. The process of producing a water soluble salt of mercury derivative of the oxycoumarin series which consists in combining the mercury derivative with a base, and evaporating the solution to dryness in a vacuum at a temperature not to exceed 100° C., substantially as described.

9. The process of producing a water soluble salt of a mercury derivative which consists in adding to a solution of a compound of the oxycoumarin series, a solution of a mercury salt, then adding a base and evaporating the solution to dryness in a vacuum at a temperature not to exceed 100° C., substantially as described.

In witness whereof I have hereunto set my hand and seal at Indianapolis, Indiana, this fifth day of November, A. D. nineteen hundred and twelve.

ALEX B. DAVIS. [L. S.]

Witnesses:
FRANK R. ELDRED,
HARLEY W. RHORBHAMEL.